March 6, 1973 D. A. ANDERSEN 3,719,151
AUTOMOBILE CONVEYOR
Original Filed May 8, 1969 2 Sheets-Sheet 2

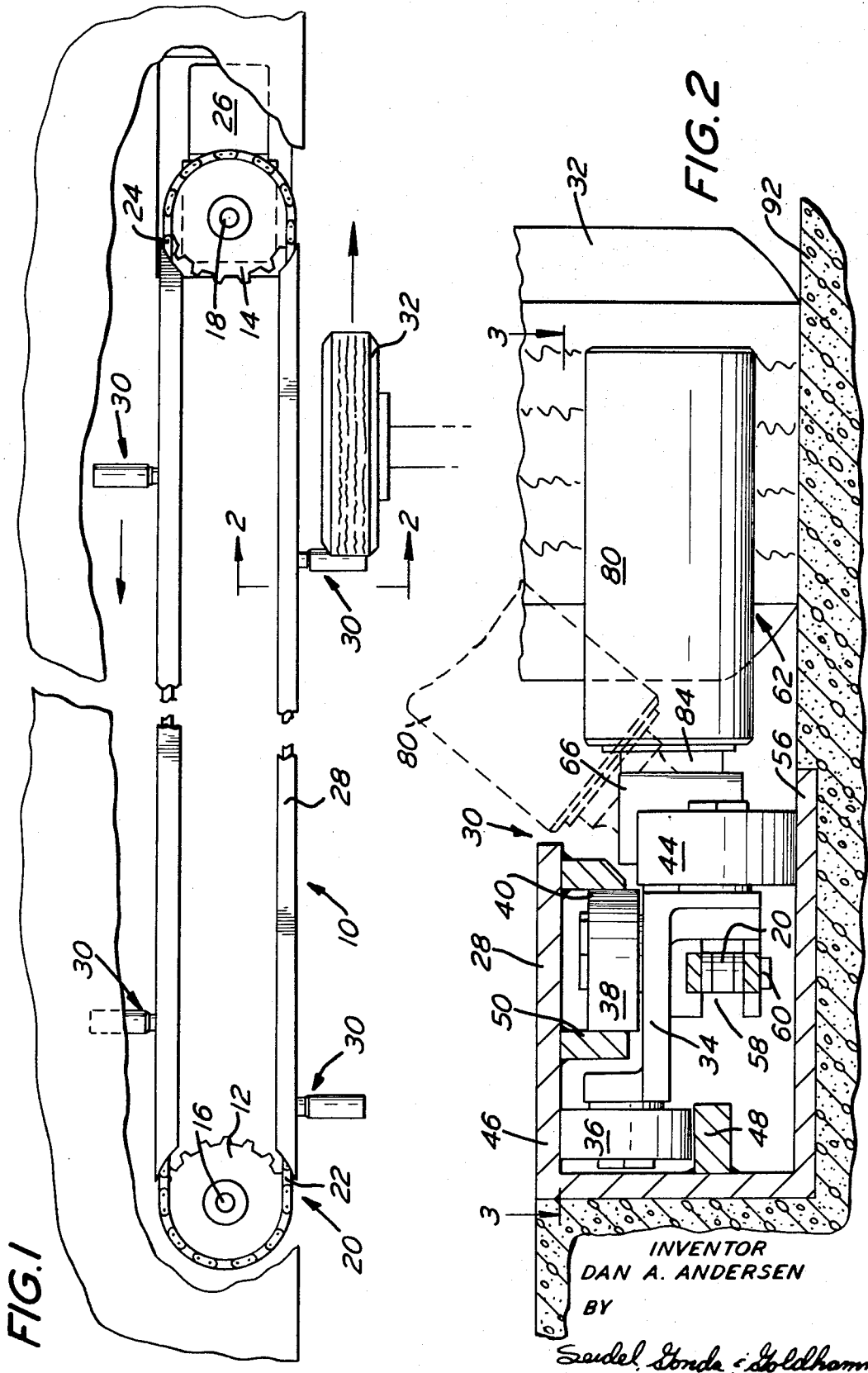

INVENTOR
DAN A. ANDERSEN
BY
Seidel, Gonda & Goldhammer
ATTORNEYS.

@# United States Patent Office 3,719,151
Patented Mar. 6, 1973

3,719,151
AUTOMOBILE CONVEYOR
Dan A. Andersen, Duarte, Calif., assignor to Chem-Therm Mfg. Co., Monrovia, Calif.
Continuation of abandoned application Ser. No. 822,888, May 8, 1969. This application June 9, 1971, Ser. No. 151,537
Int. Cl. B61j 3/04
U.S. Cl. 104—172 B                              8 Claims

ABSTRACT OF THE DISCLOSURE

An automobile conveyor is disclosed, comprising an endless chain supported by a pair of spaced sprockets to provide a drive flight and a return flight, and a guide track is disposed adjacent and partly encloses the drive flight. Drive members are coupled to the chain at spaced points thereon, the drive members comprising a dolly member affixed to the drive chain, and pusher means coupled to the dolly member adapted to drivingly contact the wheel of an automobile. The pusher means comprises an axle pivotably coupled to the dolly member for rotation about a horizontal axis, and a roller member rotatably supported on the axle for contact with the wheel of the automobile. A horizontal pivot axis between the dolly member and the axle permits the axle and roller member to ride up over obstructions adjacent the chain, and thus provides a safety feature for the conveyor.

---

This application is a continuation of Ser. No. 822,888 filed May 8, 1969, now abandoned.

This invention relates to an automobile conveyor, and more particularly, to automobile conveyors having safety features thereon.

Automobile conveyors wherein an endless chain is supported by a pair of spaced sprockets, one or more of which is driven, have heretofore been proposed. For example, in United States Pat. 3,233,557, spaced sprockets, pivotable about vertically disposed axes, support and drive a chain. Pusher members are coupled to the chain at spaced intervals. Structures somewhat similar in construction and mode of operation to the apparatus described in the above patent are shown in U.S. Pats. 3,196,-806 and 3,329,255.

Although quite satisfactory in terms of pushing performance, structures of the sort illustrated in the above patents are known to present special safety hazards in their use. For example, if a person were to accidentally step into the path of a pusher member, his foot could be caught and wedged beneath the pushing member. There would be little opportunity for him to extricate himself without serious injury. In addition to the danger to personnel, prior art conveyors of this sort are also prone to certain types of mechanical difficulties. For example, debris, tools or the like, if left adjacent the conveyor, are extremely likely to be wedged between the pusher members and the floor, thus causing jamming or breakage of the conveyor.

In the present invention, a variation from any known prior art construction, deceptive in its simplicity, avoids the above-mentioned hazards of the prior art conveyors.

Accordingly, it is an object of this invention to provide a novel automobile conveyor.

It is another object to provide an automobile conveyor of the type comprising an endless chain and pusher members, wherein safety features are provided to minimize the chances of accident or injury due to its operation.

It is another object of this invention to provide a novel pusher member for use in conveyors of the endless chain type.

Other objects will appear hereinafter.

In a presently preferred form of the invention, the foregoing and other objects are realized by an automobile conveyor comprising an endless chain supported by a pair of spaced sprockets, the chain thus having a drive flight and a return flight; a guide track disposed adjacent the drive flight, dolly members coupled to the chain at spaced points thereon and adapted to rollingly engage the guide track; and pusher means coupled to the dolly member for driving contact with the wheel of an automobile, the pusher means being coupled to the dolly member for rotation about a horizontal axis between a generally horizontal operative position and positions offset from the horizontal. The foregoing structure, it has been found, permits deflection of the pusher means in response to contact with obstructions, but in no way diminishes pushing effectiveness.

For the purpose of illustrating the invention, there is shown in the drawings a form which is presently preferred; it being understood, however, that this invention is not limited to the precise arrangements and instrumentalities shown.

FIG. 1 is a top plan view of a conveyor in accordance with the invention.

FIG. 2 is a cross-sectional view taken along the line 2—2 in FIG. 1.

Figure 3:
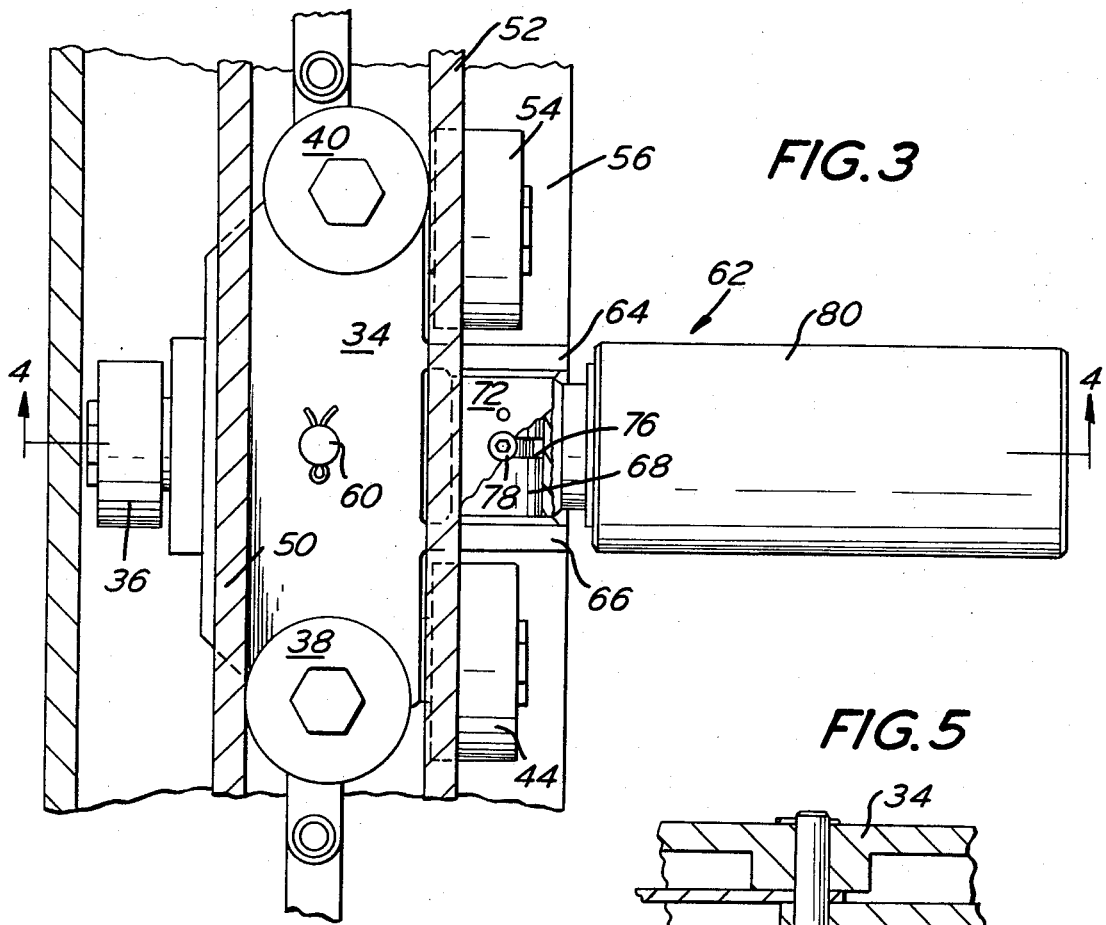
FIG. 3 is a cross-sectional view taken along the line 3—3 in FIG. 2.

Referring now to the drawings in detail, wherein like numerals indicate like elements, there is seen in FIG. 1 a conveyor designated generally by the reference numeral 10.

In the illustrated embodiment, the conveyor 10 comprises spaced sprockets 12, 14, arranged for rotation about parallel, generally vertical axes 16, 18. An endless chain, designated generally by the reference numeral 20, is disposed about the sprockets 12, 14 to provide a drive flight 22 and a return flight 24. The construction of the endless chain 20 is conventional, and per se, forms no part of the present invention. Also, conventional drive means, typically comprising an electric motor 26 and gearing, not shown, serves to impart drive to the sprocket 14 and endless chain 20.

The guide track 28, to be described in greater detail later, is disposed adjacent and partially encloses the drive flight 22 of the endless chain 20.

Pusher members, designated generally by the reference numeral 30 are coupled to the endless chain 20 at spaced points thereon. The pusher members 30 are adapted to engage the wheels of vehicles to be conveyed. For example, in FIG. 1, a pusher member 30 is in engagement with the rear wheel 32 of a conveyed vehicle.

Figure 4:
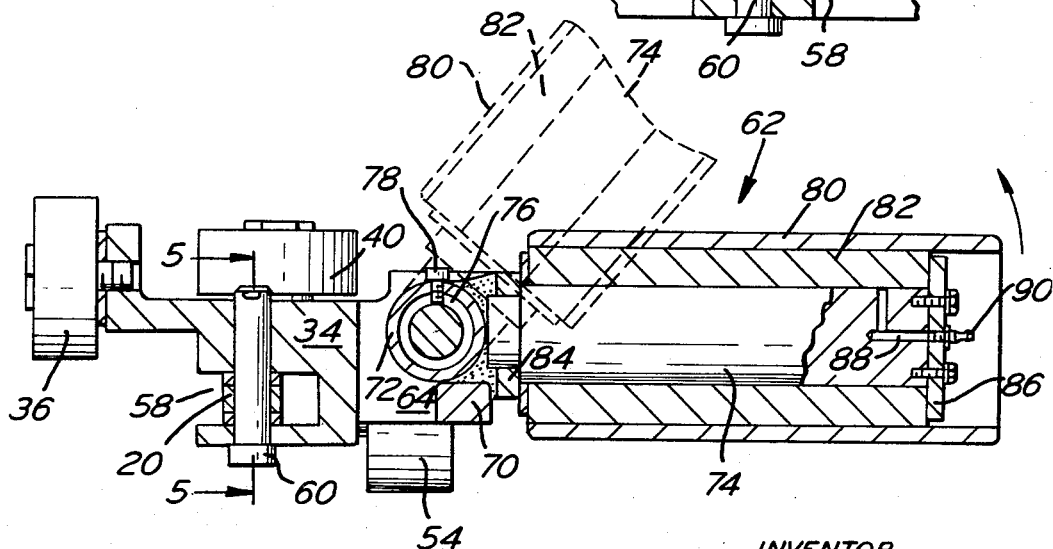
FIG. 4 is a cross-sectional view taken along the line 4—4 in FIG. 3.

Referring now to FIGS. 2, 3 and 4, there are seen the details of one embodiment of a pusher member 30 in accordance with the invention.

Referring to FIG. 2, the pusher member 30 includes a dolly member 34. The dolly member 34, in the illustrated embodiment, includes guide rollers 36, 38, 40, 54, 44 adapted to engage various portions of the guide track 28. Referring in particular to FIGS. 2 and 3, the guide roller 36 is shown in rolling engagement with a horizontally disposed upper portion 46 of the guide track 28, and above an inwardly directed horizontal flange 48, spaced from the upper portion 46. The guide roller 38 rollingly engages a flange 50 depending from the upper portion 46 of the guide track 28. The guide roller 40, it will be seen, engages another vertically disposed flange 52, depending from the upper portion 46 and spaced from the flange 50. The guide roller 44 and yet another guide roller 54, seen in FIGS. 3 and 4, engage a generally horizontally disposed lower portion 56 of the guide track 28.

Thus, it is seen that the dolly member 34 is constrained by its guide rollers 36, 38, 40, 44 and 54 and by the guide track 28 to motion in a linear path parallel to the guide track 28. Moreover, the guide rollers 38 and 40 prevent excessive canting of the dolly member 34 about vertical axes at right angles to a longitudinal axis of the guide track 28, and the guide rollers 36, 44 and 54 prevent canting about such longitudinal axis.

Figure 5:
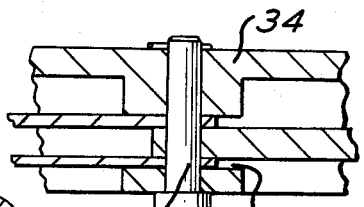
FIG. 5 is a cross-sectional view taken along the line 5—5 in FIG. 4.

Referring to FIGS. 2, 4 and 5, the dolly member 34 includes a slot 58 of a width sufficient to receive the chain 20. A pin 60 passes through aligned openings in the dolly member 34 and an opening in the chain 20, and thereby couples the dolly member 34 to the chain 20 for movement therewith.

Referring now to FIGS. 2, 3 and 4, there is seen a pusher means, designated generally by the reference numeral 62, coupled to the dolly member 34.

Referring in particular to FIG. 3, the dolly member 34 includes spaced ribs 64, 66 disposed in generally vertical planes, and projecting generally at right angles to the direction of the guide track 28. A pivot shaft 68, seen in cross section in FIG. 4, extends between the ribs 64, 66. Also extending between the ribs 64, 66 is a limit stop 70, for a purpose to be explained shortly.

A sleeve 72, to which an axle 74 is affixed, pivotably engages the pivot shaft 68. In one presently preferred form of the invention, the pivot shaft 68 is provided with a peripheral groove 76. A set screw 78 in the sleeve 72 extends into engagement with the groove 76. The set screw 78 thereby serves to maintain the pivot shaft 68 in proper position between the ribs 64, 66.

A roller member 80 is pivotally received on the axle 74. In the illustrated form, the roller member 80 includes an internal bushing 82. The roller member 80 is retained on the axle 74 by contact of the bushings 82 with a collar 84 at one of its ends and an end plate 86 at the other. The collar 84 and end plate 86 are coupled to the axle 74.

In the illustrated form, the axle 74 includes a lubrication passageway 88, seen in FIG. 4, for lubricating the interface between the axle 74 and bushing 82. A grease fitting 90 is associated with the lubrication passageway 88, and facilitates insertion of lubricant. The grease fitting 90 and end plate 86, it will be seen, are recessed within an end of the roller member 80, thus minimizing the likelihood of damage to them during operation of the conveyor 10.

The safety features inherent in the above-described conveyor 10 should now be apparent. Referring to FIGS. 2 and 4, when the pusher members 30 are in an operative disposition, they are spaced slightly from the floor 92 adjacent the guide track. The longitudinal axis of the axle 74 is disposed in a generally horizontal direction, parallel or nearly parallel to the floor 92. As is seen in FIG. 4, contact between the axle 74 and limit stop 70 determines such position. Now, if the pusher means 62 contacts the wheel 32 of an automobile to be conveyed, the roller member 80 rolls about the axle 74 in contact with the wheel 32, and transmits driving force from the endless chain 20 to propel the automobile in the direction of travel of the drive flight 22. Since the roller member 80 contacts a lower portion of the wheel 32, the pushing effort maintains the axle 74 firmly in engagement with the limit stop 70.

If, however, prior to contacting the wheel 32, the pusher means 62 engages an obstruction on the floor 92, the obstruction causes rotation of the axle 74 upwardly about the pivot shaft 68. The portions shown in dotted line in FIG. 4 depict the pusher means 62 with the axle 74 in a rotated position with respect to the pivot shaft 68. In one presently preferred form of the invention, the axle 74 may rotate to a position offset by about 45° from the above-described operative position. Thus, the roller member 80 passes harmlessly over the obstruction. When the obstruction is passed, the weight of the pusher means 62 causes rotation of the sleeve 72 with repect to the pivot shaft 68 until the axle 74 once again contacts the limit stop 70.

Thus, the presence of an obstruction adjacent the conveyor 10 causes neither stoppage of the conveyor 10 nor damage to its parts. Moreover, the risk of bodily harm to workers adjacent the conveyor 10 is greately reduced.

The present invention may be embodied in other specific forms without departing from the spirit or essential attributes thereof.

I claim:

1. An automobile conveyor comprising an endless chain supported by spaced sprockets to provide a drive flight and a return flight, a guide track disposed adjacent said drive flight and associated with a floor, drive members coupled to said chain at spaced points thereon, said drive members comprising a dolley member coupled to said chain, said dolley member having first and second wheels supported in a vertical plane for rotation about parallel horizontal axes disposed in a common horizontal plane, said dolley member having a third wheel supported at a location above said horizontal plane and rotatable about a horizontal axis parallel to said first-mentioned axes, said wheels engaging said guide track to prevent canting of said dolley member and twisting of said chain with respect to said guide track, pusher means coupled to said dolley member between said first and second wheels and adapted to drivingly contact the wheel of an automobile to be conveyed, said pusher means being pivotably coupled to said dolley member for rotation between a generally horizontal pushing position and positions upwardly offset from the horizontal, said pusher means being pivotably coupled to said dolley member for pivotable movement about an axis extending in a direction generally parallel to the path of movement of the drive flight, and limit stop means coupled to said dolley member and engageable by said pusher means to prevent movement of said pusher means about said axis beyond said generally horizontal pushing position, said pusher means being spaced from the floor when in said generally horizontal pushing position.

2. A conveyor in accordance with claim 1 wherein said dolley member is provided with fourth and fifth wheels rotatably engaging said track, said fourth and fifth wheels being mounted for rotation about vertical axes, said pusher means being connected to said dolley member at a location between the vertical axes of said fourth and fifth wheels.

3. A conveyor in accordance with claim 1 wherein said pusher means includes a roller mounted for rotation about a horizontal axis which is below and parallel to the axis of said third wheel, the axis of said roller and the axis of said third wheel lying in the same vertical palne.

4. A conveyor in accordance with claim 3 wherein said roller axis lies below a horizontal plane defined by the upper surface of said guide track, the longitudinal axis of said roller being between and equidistant from the axes of said first and third wheels.

5. A conveyor in accordance with claim 1 wherein said first and third wheels are on opposite sides of said drive flight.

6. A dolley for use in an automobile conveyor and adapted to be coupled to a chain, said dolley comprising first and second wheels supported in a vertical plane for rotation about parallel horizontal axes disposed in a common horizontal plane, said dolley having a third wheel supported at a location above said horizontal plane and rotatable about a horizontal axis parallel to said first-mentioned axes, pusher means coupled to said dolley between said first and second wheels, said pusher means being pivotably coupled to said dolley for rotation between a generally horizontal pushing position and positions upwardly offset from the horizontal, said pusher means being pivotably coupled to said dolley for pivotable movement about an axis extending in a direction generally parallel to the path of movement of the chain, limit stop means coupled to said dolley and engageable by said pusher means to prevent movement of said pusher means about said last named axis downwardly beyond said generally horizontal pushing position.

7. A dolley in accordance with claim 6 wherein said dolley is provided with fourth and fifth wheels rotatably engaging said track, said fourth and fifth wheels being mounted for rotation about vertical axes, said pusher means being connected to said dolley at a location between the vertical axes of said fourth and fifth wheels.

8. A dolley in accordance with claim 6 wherein said pusher means includes a roller mounted for rotation about a horizontal axis which is below and parallel to the axis of said third wheel, the axis of said roller and the axis of said third wheel lying in the same vertical plane.

References Cited

UNITED STATES PATENTS

| | | | |
|---|---|---|---|
| 1,686,567 | 10/1928 | Levin | 198—171 |
| 2,676,696 | 4/1954 | Gerhartz | 198—170 |
| 3,511,187 | 5/1970 | Hanna | 104—172 |
| 3,530,801 | 9/1970 | Murillo | 104—172 B |

DRAYTON E. HOFFMAN, Primary Examiner

R. SAIFER, Assistant Examiner

U.S. Cl. X.R

198—171